United States Patent
Allen et al.

(10) Patent No.: US 6,383,803 B1
(45) Date of Patent: May 7, 2002

(54) PORTABLE COMPOSTION SYSTEM WITH RECONFIGURABLE AIR FLOW

(75) Inventors: Jan Allen, Shoreline, WA (US); Chuck Kemper, Wilsonville, OR (US)

(73) Assignee: CH2M Hill, Inc., Denver, CO (US)

( * ) Notice: Subject to any disclaimer, the term of this patent is extended or adjusted under 35 U.S.C. 154(b) by 0 days.

(21) Appl. No.: 09/896,904

(22) Filed: Jun. 29, 2001

(51) Int. Cl.⁷ .................................................. C12M 1/00
(52) U.S. Cl. ................................ 435/290.1; 435/290.2; 435/290.4; 435/297.1; 71/9
(58) Field of Search ........................... 435/290.1, 290.2, 435/290.4, 297.1; 71/9, 11

(56) References Cited

U.S. PATENT DOCUMENTS

| | | |
|---|---|---|
| 4,288,241 A | 9/1981 | Shelef |
| 4,521,517 A | 6/1985 | Gauthier |
| 4,837,153 A | 6/1989 | Laurenson, Jr. |
| 4,956,002 A | 9/1990 | Egarian |
| 5,153,137 A | 10/1992 | Laurenson, Jr. |
| 5,175,106 A | 12/1992 | Laurenson, Jr. |
| 5,942,022 A | 8/1999 | Bislev et al. |
| 6,099,613 A | 8/2000 | Allen et al. |

*Primary Examiner*—David A. Redding
(74) *Attorney, Agent, or Firm*—Swanson & Bratschun LLC

(57) ABSTRACT

A portable and reconfigurable composting apparatus for controlling the airflow to and from a plurality of aerated static composting piles. The composting apparatus includes an air blower having an air intake and an air output. A suction manifold is attached in fluid communication with the air intake of the blower. A discharge manifold is attached in fluid communication with the air output of the blower. A plurality of pile manifolds are connected to the suction manifold and the discharge manifold by a manifold crossover. The manifold crossover includes a pair of dampers which allow the composting apparatus operator to independently select positive or negative air pressure for application to each pile manifold. Each pile manifold is operatively associated with an aerated static compost pile, by means of a series of flexible air lances attached in fluid communication with a pile manifold.

20 Claims, 4 Drawing Sheets

PORTABLE COMPOSTION SYSTEM WITH RECONFIGURABLE AIR FLOW

TECHNICAL FIELD

The present invention is directed toward systems for composting organic matter, and more particularly toward aerated static pile composting systems.

BACKGROUND ART

Composting systems are utilized to convert virtually any type of organic waste into usable soil or soil additives. The composting process therefore satisfies the dual environmental concerns of the safe disposal of organic waste and the generation of soil or soil additives for various horticultural applications.

Composting technology has developed in two general directions. The first family of composting methods is based upon composting organic matter in open air stacked piles. The alternative family of composting methods involves placing the organic matter in closed bins, silos or similar containers.

The composting process is primarily dependent upon the action of aerobic bacteria. The composting bacteria are most active within a somewhat limited range of oxygen, temperature and moisture contents. Therefore, the efficiency of the composting process can be enhanced by operator control of the oxygen content, temperature, and moisture content of a compost pile.

The parameters of the composting environment are not constant throughout the composting process. Bacteriological activity in a new composting pile which contains a great deal of free organic matter is much higher than the activity in an older, more nearly fully composted pile. This bacteriological activity can generate foul odors. The odor problem can therefore be acute when means are employed to enhance the composting environment and accelerate the composting process.

Closed bin composting technology has been developed to address the need to control the parameters of the composting environment and also control foul odors. Closed bin systems however, have a relatively high cost per volume of compost produced.

Certain methods have also been developed in the field of open pile composting to address the above concerns. One method, known as the turned windrow process, involves manually turning over and agitating the composting material in a windrow pile on a daily or near daily basis. This method effectively aerates the pile, but requires a great deal of labor, and also requires extra space for the maneuvering of equipment and the effective stacking and re-stacking of the agitated piles. The turned windrow process provides no means for odor control. Alternatively, a static pile can be directly aerated by a blower and air pipe system which forces air under positive air pressure through and out of the pile on a continuous basis. This method too can worsen the odor problem associated with composting.

Certain advantages are inherent in an aerated system which can provide both positive air pressure and negative air pressure to a compost pile. In particular, under negative air pressure, air and excess fluid can be withdrawn from a pile into a conduit which enhances the opportunity for moisture, temperature and odor control. One such system for compost aeration is described in Gauthier, U.S. Pat. No. 4,521,517. The Gauthier system involves a permanent underground aeration system which utilizes a non-reversible blower and air pipe dampering arrangement to aerate a single static pile. The damper arrangement allows the operator to selectively place the compost pile under positive or negative air pressure. In addition, the Gauthier system features perforated aeration pipes below the compost pile which allow moisture to be withdrawn from the pile if it is placed under negative air pressure. The Gauthier system provides no means for supplemental odor control. In addition, the Gauthier system is a permanent underground system which requires significant capital expenditure to install. Finally, each individual compost pile in a composting facility will require its own separate self-contained Gauthier system including separate pipes and separate blowers. The necessity for multiple blowers vastly increases the capital cost of a large scale composting site and increases the utility costs incurred in the operation of a composting system. Finally, there is no provision in the Gauthier system for one compost pile to be in fluid communication with another.

The problem of odor generation in an aerated static pile composting system is addressed by Allen, U.S. Pat. No. 6,099,613. The method described by Allen involves drawing air under negative air pressure through a static pile during the initial phase of composting which is the time when the pile is most biologically active and therefore generating the most odors. The air and fluid condensate withdrawn from a pile are then mixed with a second air and liquid to cool the withdrawn air and liquid. This mixture is passed through a biofilter or a wet scrubber to mineralize or otherwise eliminate odors.

The Allen method does effectively cause the accelerated composting of a large volume of organic material, while controlling the release of offensive odors. However, like the Gauthier system, the apparatus necessary to implement the Allen method must be installed permanently under an improved surface. In addition, one or more air blowers is required per compost pile to effectively implement the Allen method. These requirements significantly increase the installation cost of a composting facility and render it suitable only for permanent installations.

The present invention is directed toward overcoming one or more of the problems discussed above.

SUMMARY OF THE INVENTION

A portable composting system for reconfigurably controlling the airflow to and from a plurality of aerated static composting piles includes an air blower having an air intake and an air output. A suction manifold is attached in fluid communication with the air intake of the blower. A discharge manifold is attached in fluid communication with the air output of the blower. A plurality of pile manifolds are connected to the suction manifold and the discharge manifold by a manifold crossover. The manifold crossover includes a pair of dampers which allow the composting apparatus operator to independently select positive or negative air pressure for application to each pile manifold. Each pile manifold is operatively associated with an aerated static compost pile, by means of a series of flexible air lances attached in fluid communication with a pile manifold.

The suction manifold is also connected to a system drain. The discharge manifold is connected with a biofilter. In an alternative implementation of the portable and reconfigurable composting apparatus the biofilter may be a multiple stage biofilter. The suction manifold can also be connected to a noise reduction medium.

Organic matter can be composted with the portable and reconfigurable composting apparatus assembled as described herein by placing a volume of organic material into a plurality of static piles. The single system wide air blower operates in one direction throughout the composting process. By manipulation of the dampers incorporated in the manifold crossover, the operator can communicate each of a series of pile manifolds and associated aerated static composting piles with the blower intake or the blower output. Therefore, the operator can selectively and independently apply positive or negative air pressure to a series of piles. The air and fluid withdrawn from a static pile under negative air pressure will contain odor producing compounds. These odor producing compounds can be reduced or substantially eliminated by flowing the air and fluid withdrawn from a compost pile under negative air pressure through a biofilter. In the alternative, the air and fluid withdrawn from a pile which is producing odors can be forced under positive air pressure through another older pile which acts as a biofilter for the first pile. The operator may further vary the rate of withdraw of air and fluid from a pile under negative air pressure or the rate of the application of air to a pile under positive air pressure by manipulation of dampers associated with the suction and discharge manifolds.

The composting apparatus described above and the method of composting described above can be carried out in aerated static piles placed upon an unimproved surface. Composting will be more complete and accelerated if the organic matter in the piles is re-stacked at 10–20 day intervals.

The apparatus and method of the present invention provides for accelerated aerated static pile composting while controlling odors which are inherently generated in the composting process. The dual goals of lowered cost and portability are achieved in the present invention by the use of a novel dampering arrangement which allows each of a plurality of aerated static piles to be placed under positive or negative air pressure at the operator's discretion while utilizing only a single non-reversible system wide air blower. Furthermore, no pavement or permanent installation is necessary to implement the present invention, which further reduces installation costs and enhances portability.

DETAILED DESCRIPTION OF THE PREFERRED EMBODIMENT

Figure 1:
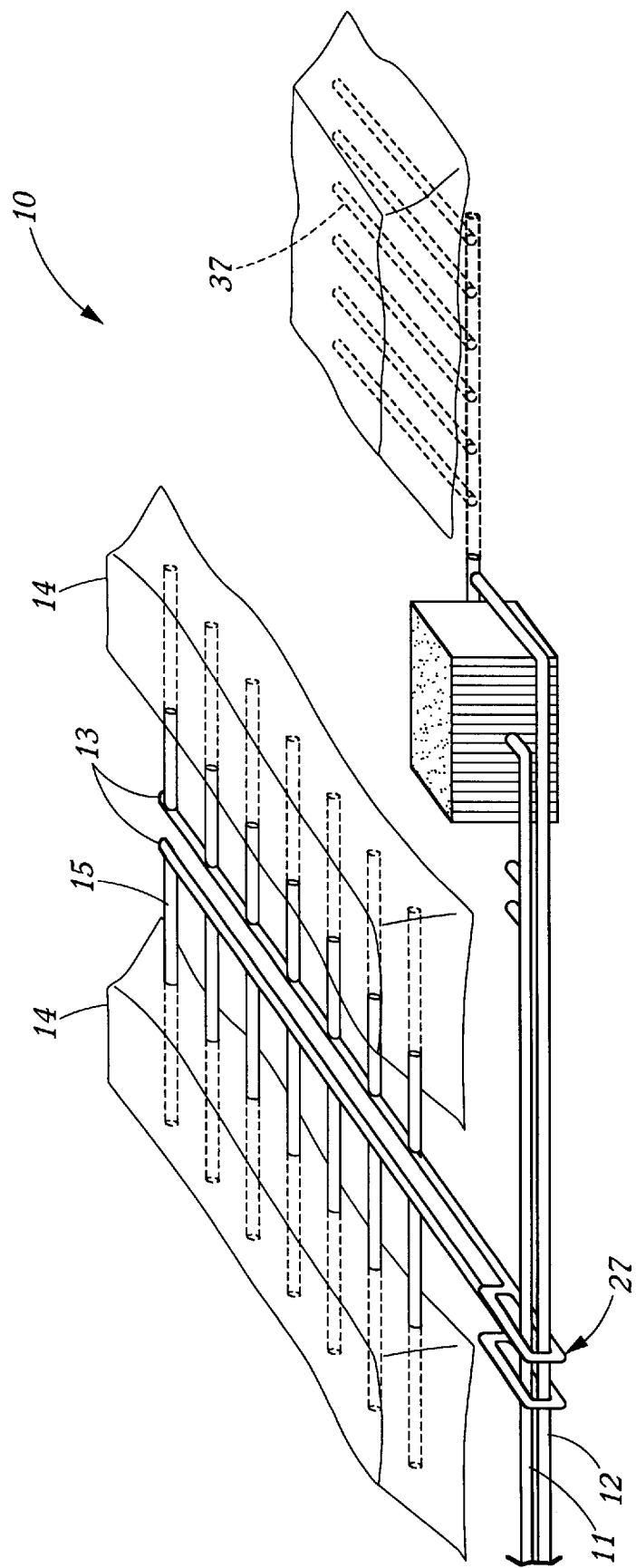
FIG. 1 is perspective view of a portable and reconfigurable composting system.

Referring to FIG. 1, portable and reconfigurable composting apparatus 10 includes a suction manifold 11, a discharge manifold 12 and a plurality of pile manifolds 13. Each pile manifold is operatively associated with an aerated static compost pile 14 by means of air lances 15.

Figure 2:
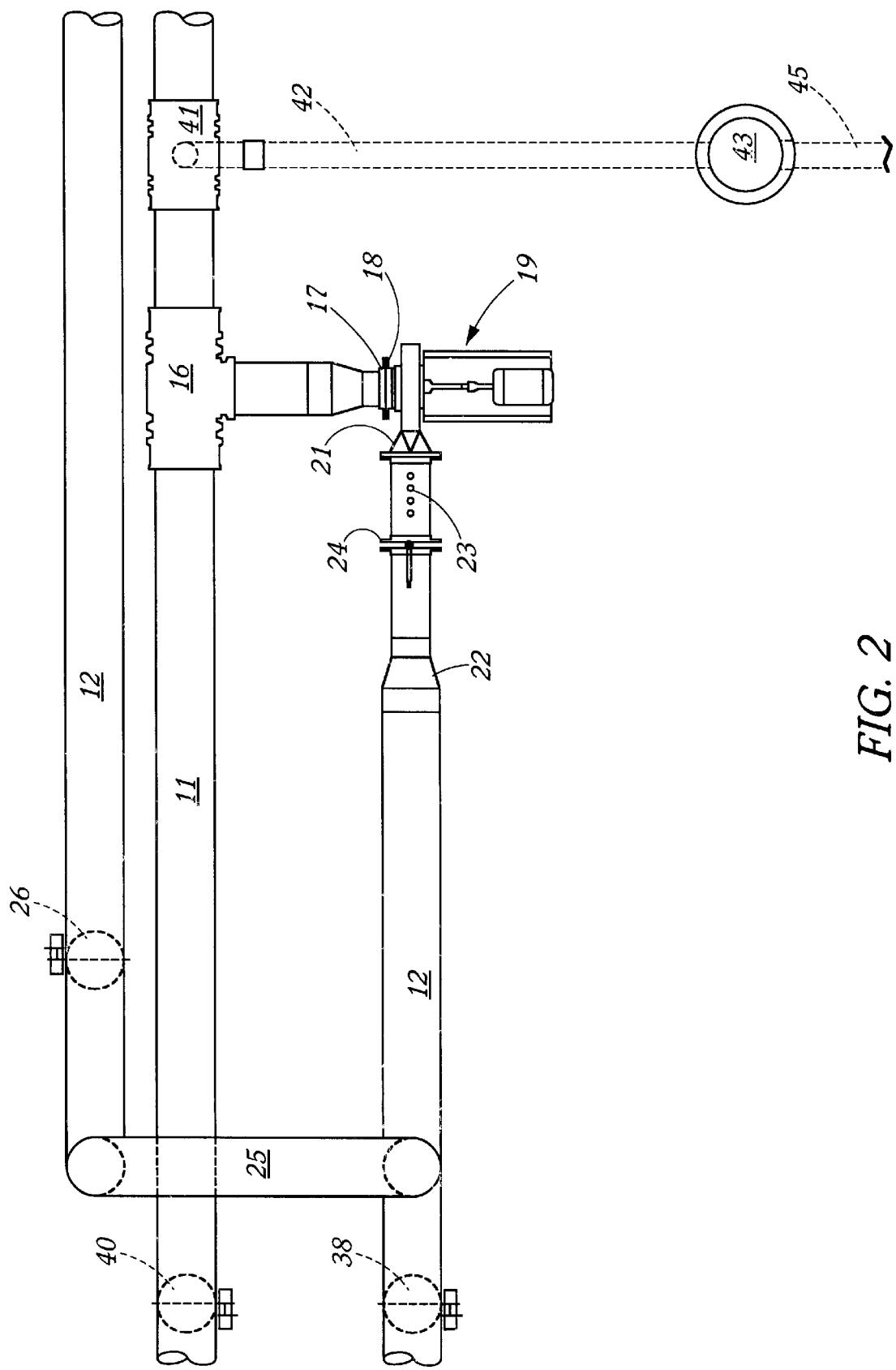
FIG. 2 is a plan view of the system blower, suction manifold and discharge manifold attachments thereto.

As shown in FIG. 2, the suction manifold 11 is connected via a T-fitting 16 and a coupling 17 to the intake side 18 of an air blower 19. The output side 20 of the air blower 19 is connected via a coupling 21 and a fitting 22 to the discharge manifold 12. Testing and sampling ports 23 are located in the discharge manifold 12 immediately downstream from the output side 20 of the air blower 19. A damper 24 is located in the discharge manifold 12 immediately downstream of the testing and sampling ports 23.

Figure 3:
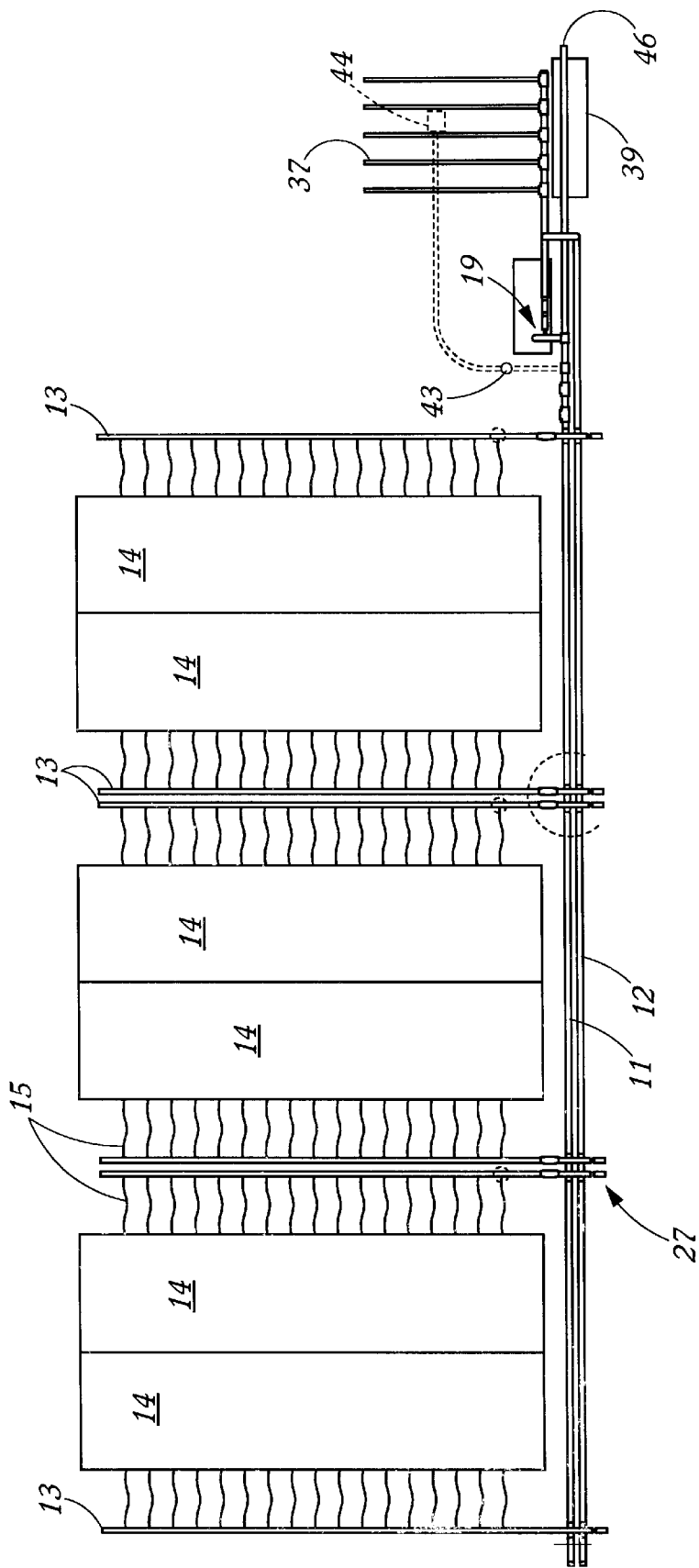
FIG. 3 is a plan view of the portable and reconfigurable composting system.

A bridge portion 25 of the discharge manifold 12 redirects the discharge manifold 12 such that it runs adjacent to and parallel with the suction manifold 11. As is shown in FIG. 3 the suction manifold 11 and discharge manifold 12 run parallel and adjacent to each other lengthwise through the field of the composting apparatus 10. Returning to FIG. 2, damper 26 is positioned immediately downstream from the bridge portion 25 of the discharge manifold 12.

Figure 4:
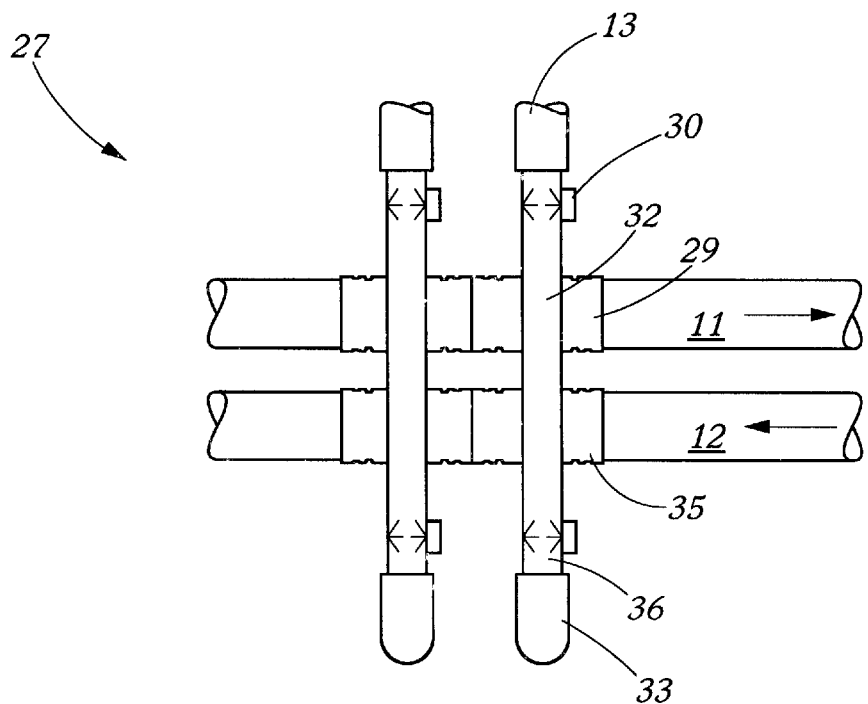
FIG. 4 is a plan view of a manifold crossover.
Figure 5:
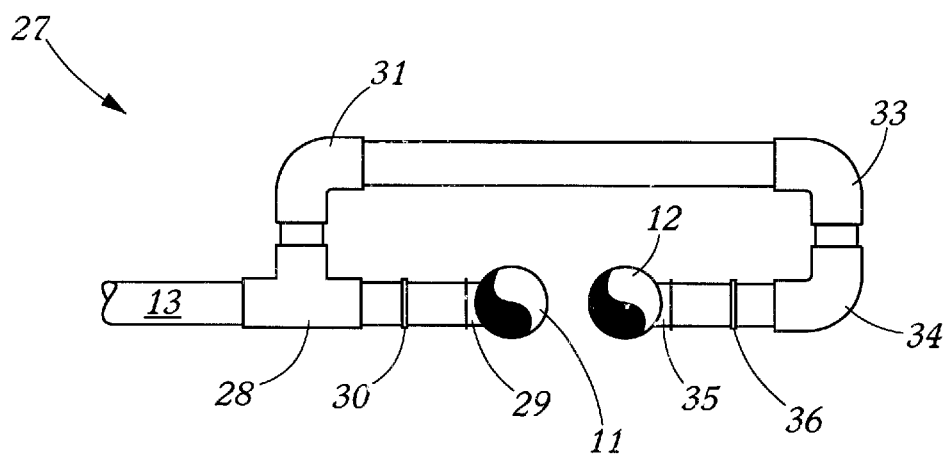
FIG. 5 is a side elevation view of the manifold crossover.

As is shown in FIGS. 4 and 5, an end of each pile manifold 13 is operatively connected to both the discharge manifold 12 and the suction manifold 11. Specifically, the pile manifold 13 is connected to the discharge manifold 12 and the suction manifold 11 by means of a manifold crossover 27. More particularly, the end of the pile manifold 13 proximate the suction manifold 11 and discharge manifold 12 is connected to a T-fitting 28. The straight-through branch of the T-fitting 28 is connected via a T-fitting 29 to the suction manifold 11. A damper 30 is located between the T-fitting 28 and the suction manifold 11. The right angle branch of the T-fitting 28 is connected to the discharge manifold 12 via an elbow connection 31, a crossover pipe 32, two more elbow fittings 33 and 34 and a T-fitting 35. A damper 36 is located between the discharge manifold 12 and elbow 32. Alternatively, a single damper could be located in the T-fitting 28, in place of the separate dampers 30 and 36.

As is shown in FIG. 3, each of the plurality of pile manifolds 13 is connected at one end to the suction manifold 11 and discharge manifold 12 and at spaced intervals along its length to a plurality of air lances 15. The air lances are placed in and underneath the aerated static pile 14 associated with each pile manifold 13. The air lances are made from a flexible and durable material such as 6 inch PVC pipe.

As is shown in FIGS. 1, 2 and 3 the discharge manifold 12 at its end opposite the plurality of attached pile manifolds 13 is connected to a biofilter 37. A damper 38 is positioned between the biofilter 37 and the bridge portion of the discharge manifold 25. The biofilter 37 as depicted in FIG. 3 is a single stage biofilter which will house a substrate conducive to the growth of bacteria which will mineralize the odor producing compounds contained in the air in the discharge manifold 12. In an alternative embodiment the biofilter 37 may be a multiple staged biofilter in which the initial stages of the multiple staged biofilter operate as an evaporative cooler and the following stages of the multiple staged biofilter house a medium conducive to the growth of mineralizing bacteria which will eliminate odors.

An end of the suction manifold 11 opposite to the attachment points of the plurality of pile manifolds 13 is operatively associated with a sound silencing medium 39, and fresh air inlet 46. The fresh air inlet 46 is open to the atmosphere to supply oxygen and cooler (atmospheric) air to reduce both the temperature and dew point of the air in the system. A damper 40 is positioned in the suction manifold 11 between the T-fitting 16 and the sound silencing medium 39. The suction manifold 11 is attached by a drainage T-fitting 41 to a drainpipe 42. The drain pipe 42 leads to a sump 43. A catch basin 44 is located beneath the biofilter 37 and connected to a drainpipe 45 which is also connected to the system sump 43.

With the portable and reconfigurable composting system apparatus assembled as described above the system operates as follows. The operator places the organic material to be composted in piles 14 adjacent to a plurality of pile manifolds 13. The initial density of the organic material to be composted is limited to between 500 and 1,000 pounds per cubic yard. The maximum stacked height of a given pile 14 is 15 feet. The organic material to be composted is placed on a plurality of air lances 15, or the air lances are inserted into the pile 14 by the operator after the pile is stacked.

At all times in which the system is operating, the air blower 19 draws air under negative air pressure through the suction manifold 11 and forces air under positive air pressure through the discharge manifold 12. The operator can selectively provide positive or negative air pressure aeration to any pile to enhance and accelerate the growth and activity of the aerobic composting bacteria. This is accomplished by manipulation of the dampers in the manifold crossover 27. For example, if damper 30 is open and damper 36 is closed, the associated pile manifold 13 will be subject to negative air pressure. On the contrary, if damper 30 is closed and damper 36 is open, the associated pile manifold 13 will be subject to positive air pressure. If both dampers are closed, pile manifold 13 is taken off line. If the alternative single damper in the T-fitting 28 is employed, negative air pressure is achieved by closing the right angle branch of the T-fitting 28, and positive air pressure is achieved by closing the straight through branch of the T-fitting. Each pile manifold 13 may be adjusted independently from any other pile manifold 13 as desired by the operator.

Dampers 24 and 26 are used to control the volume of air flowing from the air blower 19 into the discharge manifold 12, and can be used to control a rate at which air is applied to or withdrawn from the pile manifolds 13.

Certain tests and samplings such as the temperature or fluid content of the air being blown through the air blower 19 can be performed at the sampling and testing ports 23.

If a given pile manifold 13 is subjected to negative air pressure by the operation of the manifold crossover 27, ambient air will be drawn into the associated pile 14 providing enriching oxygen to the bacteria therein. In addition, air and fluid condensate will be withdrawn from the pile 14 and into the suction manifold 11. This provides for pile fluid content and temperature control. Fluid condensate withdrawn from a pile 14 is collected in the system sump 43. Air withdrawn from a pile 14 may contain noxious odor causing compounds. These noxious odor causing compounds can be substantially reduced by circulating a portion of the odor bearing air in the suction manifold 11 through the air blower 19 into the discharge manifold 12 and by opening damper 38, through the biofilter 37. Alternatively, odor bearing air withdrawn from a pile under negative air pressure can be circulated to a more mature pile 14 under positive air pressure, by opening damper 30 and closing damper 36 in the manifold crossover 27 associated with the younger pile and closing damper 30 and opening damper 36 in the manifold crossover 27 associated with the more mature pile. In this instance, the more mature pile 14 acts as a biofilter for the younger odor producing pile 14.

In the event the air withdrawn from a younger more biologically active pile needs to be cooled prior to biofiltration, a multiple stage biofilter may be utilized. The initial stages of a multiple stage biofilter act as an evaporative cooler. The subsequent stages provide for odor reduction.

The above apparatus and method of operation provides for the selective application of positive or negative air pressure to each of a plurality of aerated static compost piles. The direction of the airflow applied to each pile can be independently controlled by manipulation of dampers 30 and 36 as described above. Furthermore, this level of control is achieved with only a single system air blower 19. Finally, the rate of the positive or negative airflow applied to a given pile can be varied by adjustment of dampers 30 and 36 or the system wide rate of airflow can be varied by adjustment of dampers 24 and 26.

It is advantageous for the operator to re-stack each pile 14 at 10–20 day intervals. When the above methods are followed with the portable and reconfigurable composting equipment, complete composting can occur over a 3–9 week process, depending upon the type of organic material being composted.

All major system components can be installed above ground on an unimproved surface. This feature in conjunction with the need for only one air blower allows the composting system to be both significantly less expensive than alternative technologies and fully portable.

Still other aspects and advantages of the present invention can be obtained from a study of the specification, drawings and the appended claims.

What is claimed is:

1. A composting apparatus for controlling the airflow to and from a plurality of aerated static composting piles comprising:

an air blower having an air intake and an air output;

a suction manifold in fluid communication with the air intake of the blower;

a discharge manifold and in fluid communication with the air output of the blower;

a plurality of pile manifolds for operative association with one of a plurality of compost piles positioned away from the blower;

a damper operatively connected between each pile manifold and the suction and the discharge manifolds, selectively providing for fluid communication between the associated pile manifolds and one of the suction and the discharge manifolds.

2. The composting apparatus of claim 1 wherein the suction and discharge manifolds are elongate and the pile manifolds are positioned at intervals along the length of the suction and discharge manifolds.

3. The composting apparatus of claim 1 wherein the suction manifold is connected in fluid communication with a drain.

4. The composting apparatus of claim 1 wherein the discharge manifold is connected in fluid communication with a biofilter.

5. The composting apparatus of claim 4 wherein the biofilter is a multiple stage biofilter.

6. The composting apparatus of claim 1 wherein the suction manifold is connected in fluid communication with a noise reduction medium.

7. The composting apparatus of claim 1 wherein the suction manifold is connected in fluid communication with a fresh air inlet.

8. An aerated static pile composting system comprising:

an air blower having an air intake and an air output;

a suction manifold in fluid communication with the air intake of the blower;

a discharge manifold and in fluid communication with the air output of the blower;

a plurality of pile manifolds;

a damper operatively connected between each pile manifold and the suction and discharge manifolds each damper selectively providing for fluid communication between one of the pile manifolds and one of the suction and discharge manifolds;

a plurality of aerated static composting piles; and a plurality of lances in fluid communication with the pile manifolds.

9. The composting system of claim 7 further comprising a biofilter operatively associated with the discharge manifold.

10. The composting system of claim 8 wherein one of the aerated static composting piles acts as a biofilter for another of the aerated static composting piles.

11. The composting system of claim 8 wherein the biofilter is a multiple stage biofilter.

12. The composting system of claim 7 wherein the suction manifold, the discharge manifold, the pile manifolds, the blower and the aerated static composting piles are installed above ground level on an unpaved surface.

13. A method of aerated static pile composting comprising:

placing a volume of organic material in a plurality of piles;

providing a single air blower having an intake creating negative air pressure and an output creating positive air pressure; and selectively communicating each pile with one of the blower intake and the blower output.

14. The method of claim 12 further comprising biofiltration of the air and fluid condensate withdrawn from a pile under negative air pressure.

15. The method of claim 13 further comprising biofiltration of the air and fluid condensate withdrawn from a pile under negative air pressure with another pile under positive pressure.

16. The method of claim 13 further comprising biofiltration of the air and fluid condensate withdrawn from a pile with a multiple stage biofilter.

17. The method of claim 12 further comprising varying the rate of the withdraw of air and fluid condensate from a pile under negative air pressure.

18. The method of claim 12 further comprising adjusting the rate at which air is forced into a pile under positive air pressure.

19. The method of claim 12 further comprising placing the organic matter in the piles on an unimproved surface.

20. The method of claim 12 further comprising re-stacking the organic material in the piles at 10–20 day intervals.

* * * * *